(12) United States Patent
Steinberg et al.

(10) Patent No.: US 6,898,029 B2
(45) Date of Patent: May 24, 2005

(54) OPTICAL BENCH WITH ALIGNMENT SUBASSEMBLY

(75) Inventors: Dan A. Steinberg, Blacksburg, VA (US); Mindaugas F. Dautartas, Blacksburg, VA (US); Hui Luo, Markham (CA)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/988,055

(22) Filed: Nov. 16, 2001

(65) Prior Publication Data

US 2004/0057686 A1 Mar. 25, 2004

Related U.S. Application Data

(60) Provisional application No. 60/249,792, filed on Nov. 16, 2000.

(51) Int. Cl.⁷ .............................. G02B 7/02; G02B 6/36; D06N 7/04
(52) U.S. Cl. ...................... 359/819; 359/821; 359/823; 385/88; 428/143
(58) Field of Search ................................ 359/819, 821, 359/823, 827; 385/88, 147, 141, 14; 428/143, 172, 141

(56) References Cited

U.S. PATENT DOCUMENTS

| | | | |
|---|---|---|---|
| 5,179,609 A | 1/1993 | Blonder et al. | 385/89 |
| 5,264,392 A | 11/1993 | Gaebe et al. | 438/27 |
| 5,481,629 A | 1/1996 | Tabuchi | 438/27 |
| 5,555,333 A | 9/1996 | Kato | 385/89 |
| 5,848,211 A | 12/1998 | Yang et al. | 385/93 |
| 5,862,283 A * | 1/1999 | Trott et al. | 385/88 |
| 6,136,411 A | 10/2000 | Dautartas | 428/141 |

* cited by examiner

*Primary Examiner*—Timothy Thompson
(74) *Attorney, Agent, or Firm*—Jonathan D. Baskin

(57) ABSTRACT

An optical subassembly which positions an optical device is described. The optical device is mounted on a plurality of spheres or columns placed in predetermined positions in an upper surface of a substrate. The predetermined positions include pits formed in the upper surface of the substrate. The spheres may be the same size or may be of varying sizes. Pits or grooves also may be formed in the optical device. The optical device may be formed with flexure positions to assist in holding it in place on the spheres. Further, the optical device, spheres and substrate may be metallized or formed of metal and the surface tension forces of solder may be utilized to position the optical device.

40 Claims, 11 Drawing Sheets

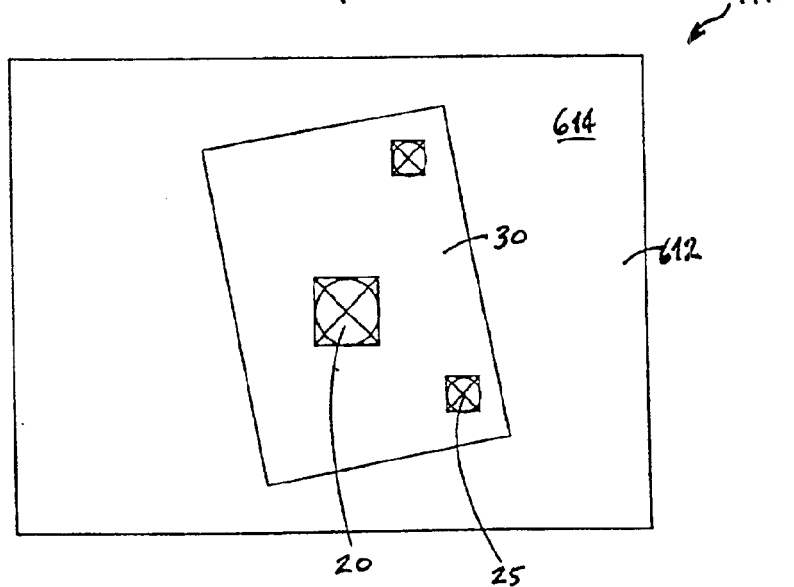
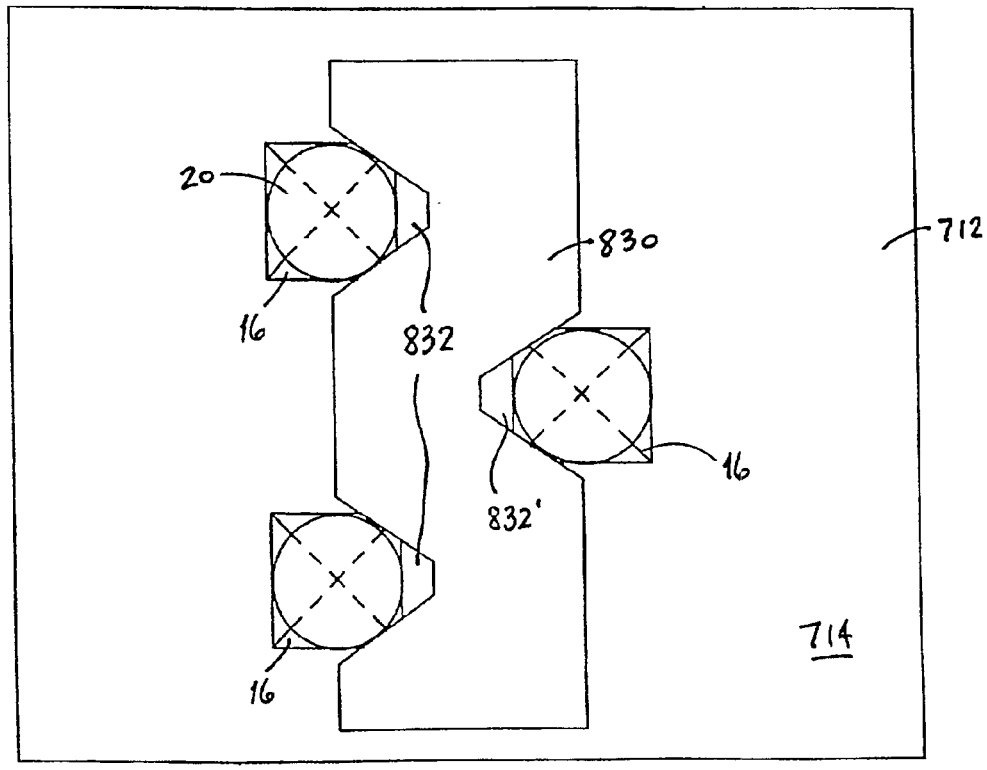

OPTICAL BENCH WITH ALIGNMENT SUBASSEMBLY

This application claims priority from provisional application Ser. No. 60/249,792, filed Nov. 16, 2000, the entire disclosure of which is incorporated herein by reference.

FIELD OF THE INVENTION

The invention generally relates to an optical subassembly, and more particularly to an optical subassembly which has accurately positioned spheres on a substrate that provide angular control to optical devices about a rotational axis.

BACKGROUND

The use of optical benches is known. Optical benches simplify optical packaging arrangements, and sometimes provide self-alignment between various optical devices.

SUMMARY

The invention provides an optical subassembly that includes a substrate having an upper surface and a plurality of pits, and a positioning mechanism disposed in each pit, wherein the optical device is positioned on the positioning mechanisms.

One aspect of the invention includes an optical subassembly with a substrate having an upper surface and a plurality of pits, an optical device having a pair of opposing long surfaces and a pair opposing edge surfaces, one of the edge surfaces disposed on the upper surface, and a plurality of spheres each being disposed within a respective pit, wherein on the upper surface, wherein said optical device is positioned on the spheres.

The invention further provides a method for positioning an optical device on an upper surface of a substrate. The method includes mounting a plurality of positioning mechanisms in predetermined locations on the substrate, mounting the optical device on the positioning mechanisms, and anchoring the optical device.

These and other advantages and features of the invention will be more readily understood from the following detailed description of the invention which is provided in connection with the accompanying drawings.

BRIEF DESCRIPTION OF THE DRAWINGS

FIG. 16 is a top view showing an optical subassembly constructed in accordance with another embodiment of the invention.

FIG. 17 is a top view showing an optical subassembly constructed in accordance with another embodiment of the invention.

DETAILED DESCRIPTION OF PREFERRED EMBODIMENTS

Figure 1:
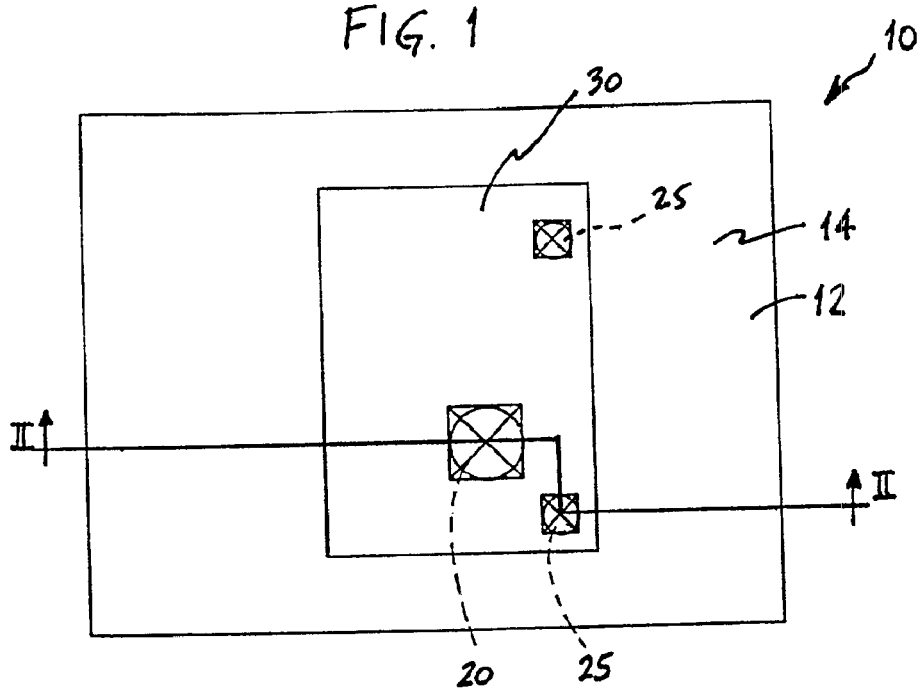
FIG. 1 is a top view showing an optical subassembly in accordance with an embodiment of the invention.
Figure 2:
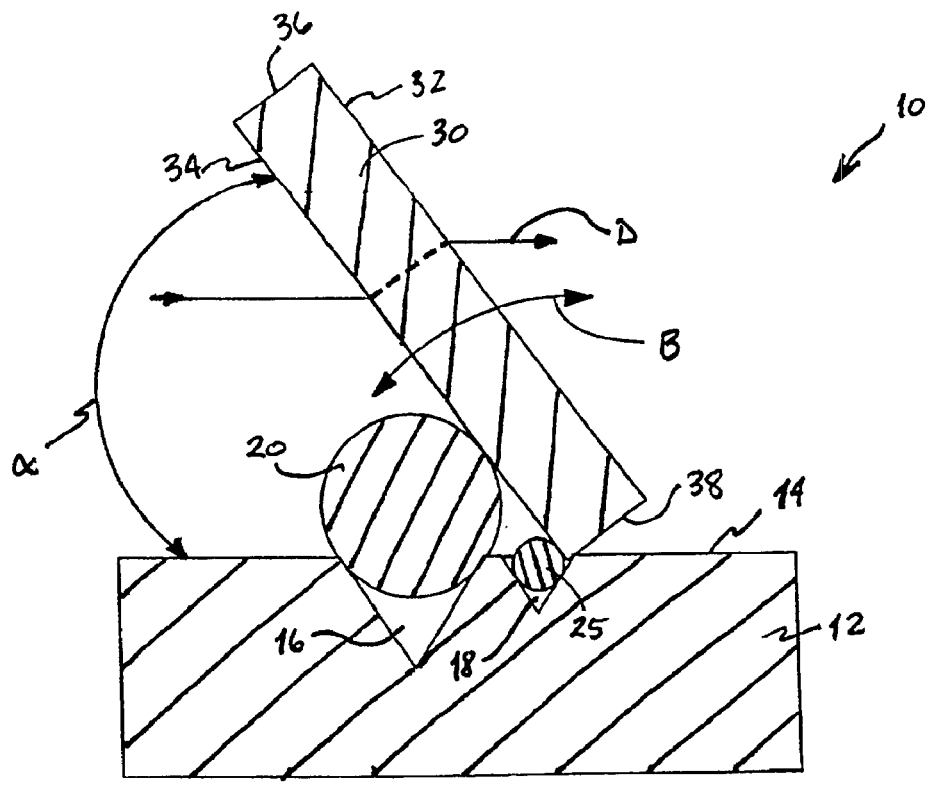
FIG. 2 is a cross-sectional view taken along line II—II of FIG. 1.

Referring now to FIGS. 1–2, there is shown an optical subassembly 10 which includes a substrate 12, a large sphere 20, a pair of smaller spheres 25, and an optical device 30. It should be appreciated that references to large spheres 20 and small spheres 25 are relative, and the spheres that may be used may be of a variety of different sizes, with the spheres 20 being larger than the spheres 25. The substrate 12 may be formed of silicon, glass, ceramic, metals (stamped), or other suitable materials, while the spheres 20, 25 may be made of hard ceramics or metals, silicon oxide, silicon nitride, zirconium or stainless steel, for example. For ease of illustration, the spheres 20, 25 are shown through the optical device 30. The sphere 20 is positioned within a micromachined pit 16 in an upper surface 14 of the substrate 12, while the spheres 25 are positioned within a micromachined pit 18. The position and size of the spheres 20, 25 determine the position of the optical device 30 and can also determine the angular orientation of the optical device 30 relative to the substrate 12. Specifically, the size and position of the spheres 20, 25 determines the position of the optical device 30 along a direction of rotation control B and positions the optical device 30 at an angle a relative to the substrate 12. In this way, light D can be angularly displaced, and thereby moved to a different plane parallel to the upper surface 14 of the optical subassembly 10. The optical device 30 includes a pair of opposing long planar surfaces 32, 34 and a pair of edge surfaces 36, 38.

As illustrated in FIG. 2, the optical device 30 is disposed upon the upper surface 14 at its edge surface 38, and rests against the spheres 20, 25 on its long surface 34. When the optical device 30 is mounted in the desired position, an adhesive material, such as, for example, ultraviolet curable epoxy or solder, can be used to hold the device 30. In this way, accurate angular alignment is provided. The optical device 30 can be a filter, modulator, detector, MOEMS device, micromechanical device, or other suitable device.

Figure 3:
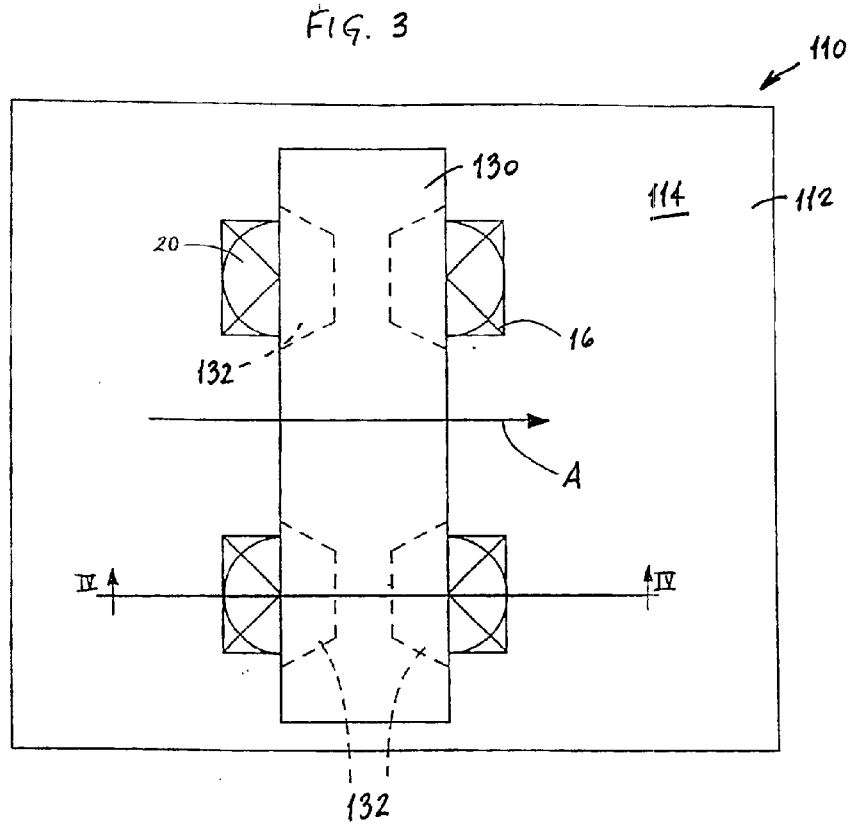
FIG. 3 is a top view of an optical subassembly constructed in accordance with another embodiment of the invention.
Figure 4:
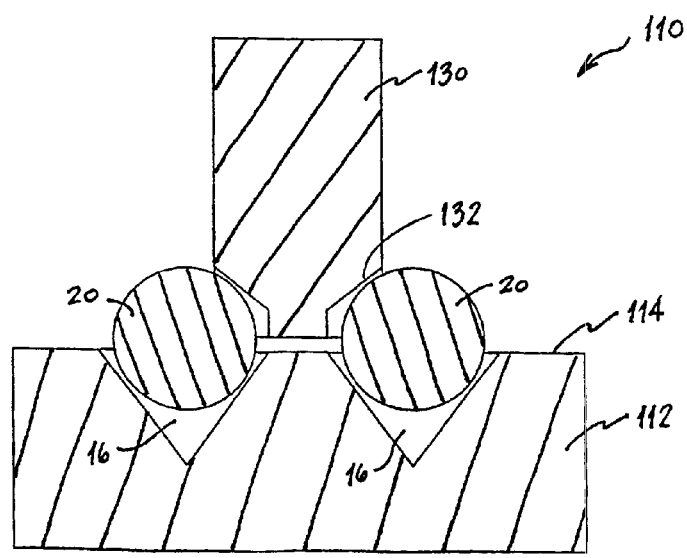
FIG. 4 is cross-sectional view taken along line IV—IV of FIG. 3.
Figure 6:
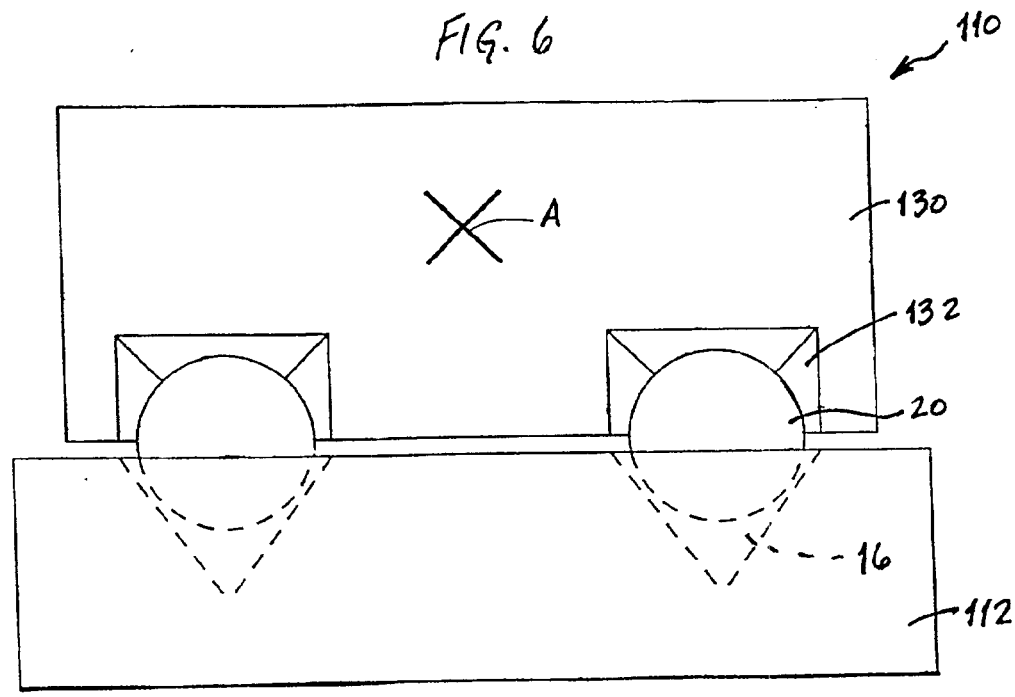
FIG. 6 is a side view of the optical subassembly of FIGS. 3–5.

FIGS. 3–4 and 6 illustrate an alternative embodiment, showing an optical subassembly 110 with a substrate 112 and an optical device 130. The optical device 130 includes cut-out portions, such as micromachined pits 132 which, with the pits 16, hold the spheres 20. In this illustrated embodiment, four spheres 20 fit within each pair of pits 16, 132 and are used to orient the optical device 130. As shown, the optical device 130 is approximately perpendicular to the top surface 114 of the substrate 112 (FIG. 4). Also, the use of the same size spheres 20 allows a lower edge of the optical device 130 to be approximately parallel with the upper surface 114 (FIG. 6). The pits 132 may be formed by any suitable process, such as, for example, etching.

Figure 5:
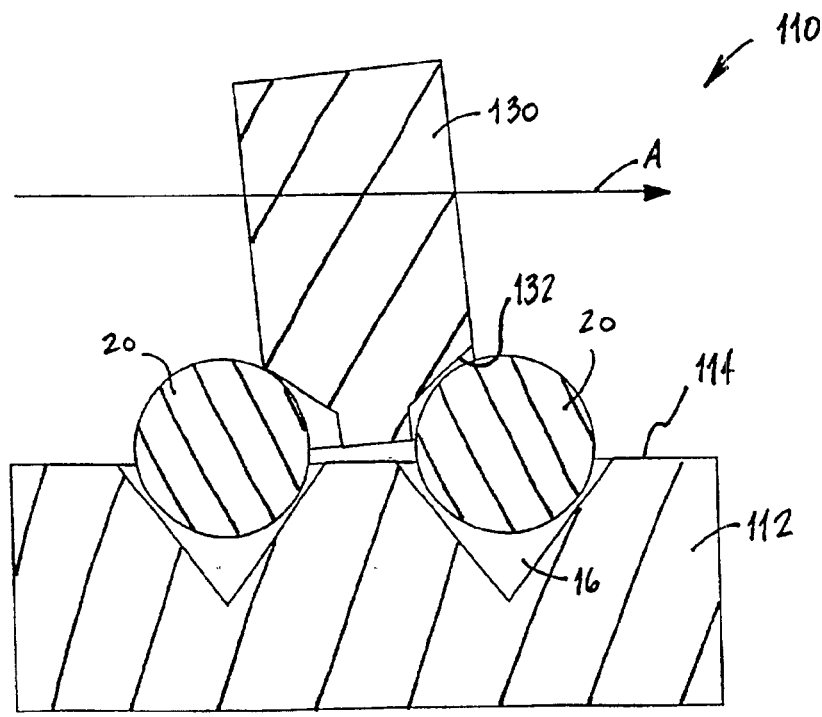
FIG. 5 is another cross-sectional view like FIG. 4.

As shown in FIG. 5, the optical device 130 can be pivoted by sliding it against the spheres 20. If, for example, the optical device 130 is a filter or grating, pivoting of the optical device 130 can provide tilt-tuning capability. Once an appropriate angular alignment is obtained, ultraviolet light curable adhesive, or solder, or other suitable adhesive may be used to permanently affix the optical device 130 to the spheres 20 or the substrate 112.

Figure 19:
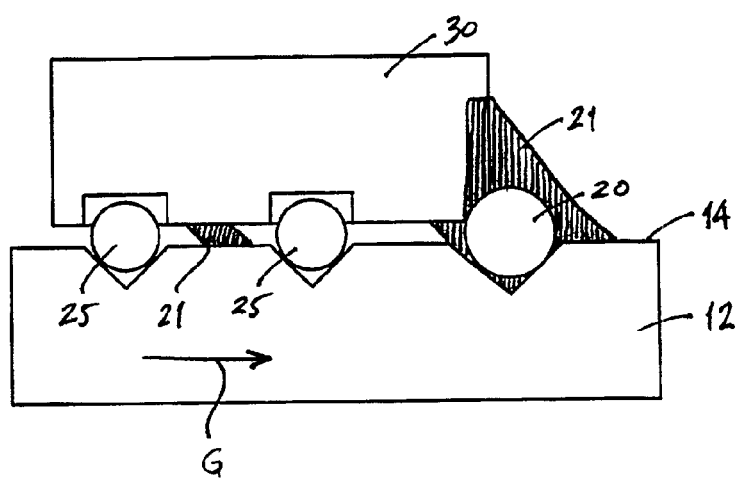
FIG. 19 is a side view showing surface tension forces on an optical subassembly constructed in accordance with an embodiment of the invention.

As a form of adhesive, a solder material 21 may be utilized to affix the optical device 30 to the spheres 20, 25. As shown in FIG. 19, a solder material 21 is used to affix the optical device 30 with the substrate 12 and with the sphere 20. In order to utilize the solder material 21, the optical device 30 and the substrate 12 must be metallized. Further, either metallic or metallized spheres 20, 25 may be used if they are to be wetted with the solder material 21. The solder material 21 can be so formed as to create surface tension forces G in such a direction as to assist in pulling the optical device 30 into position on the substrate 12. As shown, the surface tension forces G from the molten solder material 21 pull the optical device 30 to press against the sphere 20.

Figure 7:
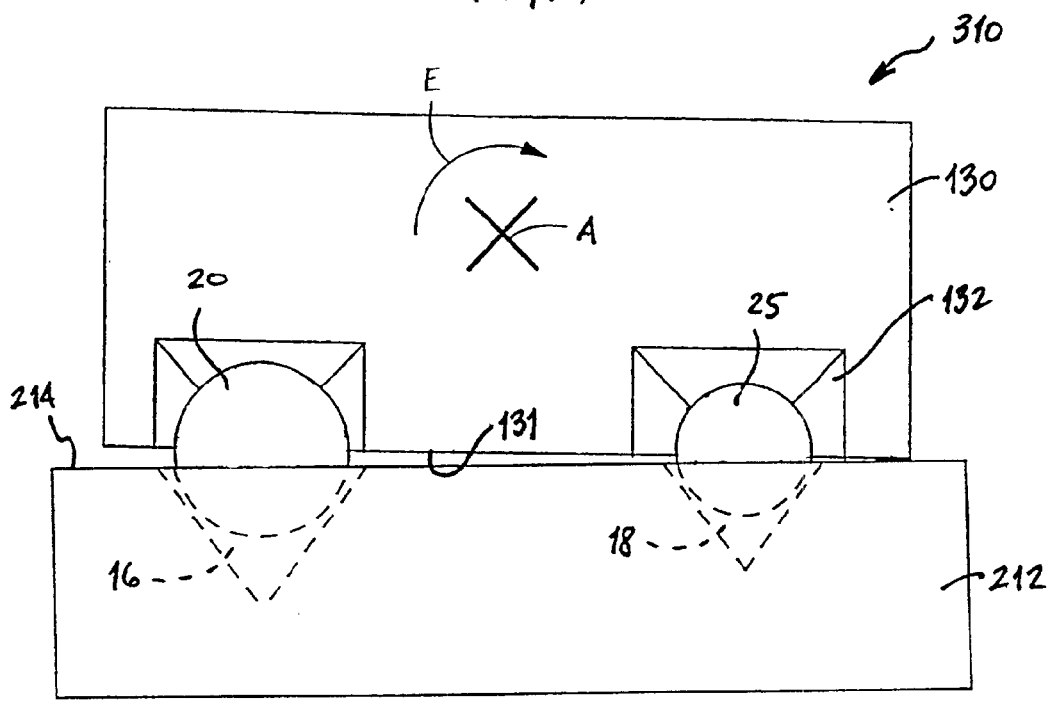
FIG. 7 is a side view of an optical subassembly constructed in accordance with another embodiment of the invention.

FIG. 7 illustrates another optical subassembly 310, which includes the optical device 130 which is rotated an angular distance E about the optical axis A. The rotation of the optical device 130 is obtained by utilizing both spheres 20 and spheres 25 within the pits 132. As noted previously, the spheres 25 are smaller in diameter than the spheres 20. The use of spheres 25 within the pits 18, 132 allows the optical device 130 to rest lower at one end than at the other end, which is mounted on the spheres 20 within the pits 16, 132. In this way, a lower surface 131 of the optical device 130 does not rest squarely on the surface 214 of the substrate 212, but instead is at an angle with the surface 214.

Figure 8:
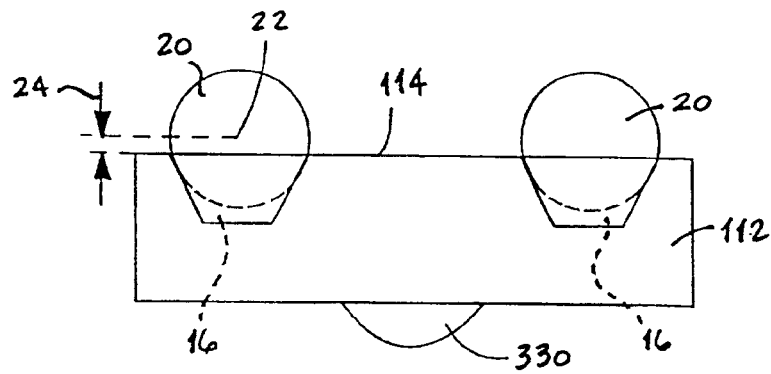
FIG. 8 is a side view showing ball lenses of an optical subassembly constructed in accordance with another embodiment of the invention.

The pits 16, 18 and the spheres 20, 25 should be sized so that the centers of the spheres 20, 25 are above the top surface of the substrate. FIG. 8 is a side view showing that the pits 16 and the spheres 20 are sized such that the centers of the spheres 20 are a distance 24 above the upper surface 114 of the substrate 112. The distance 24 should be between about 20 and 200 microns above the upper surface of the substrate. As illustrated, the pits 16 may take on a different profile than the V-shape shown in FIGS. 2 and 4–8. The optical subassembly shown in FIG. 8 further includes a lens 330 mounted on an opposite surface from the upper surface 114.

Figure 14:
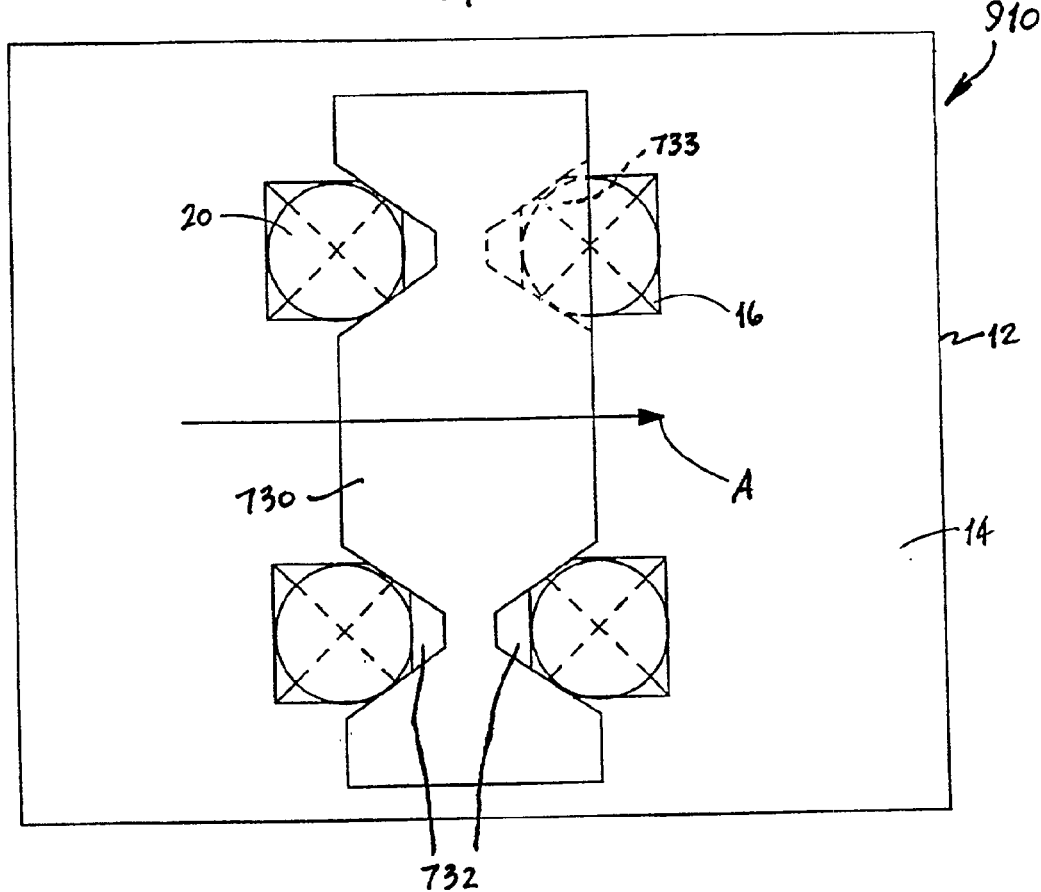
FIG. 14 is atop view showing an optical subassembly constructed in accordance with another embodiment of the invention.
Figure 15:
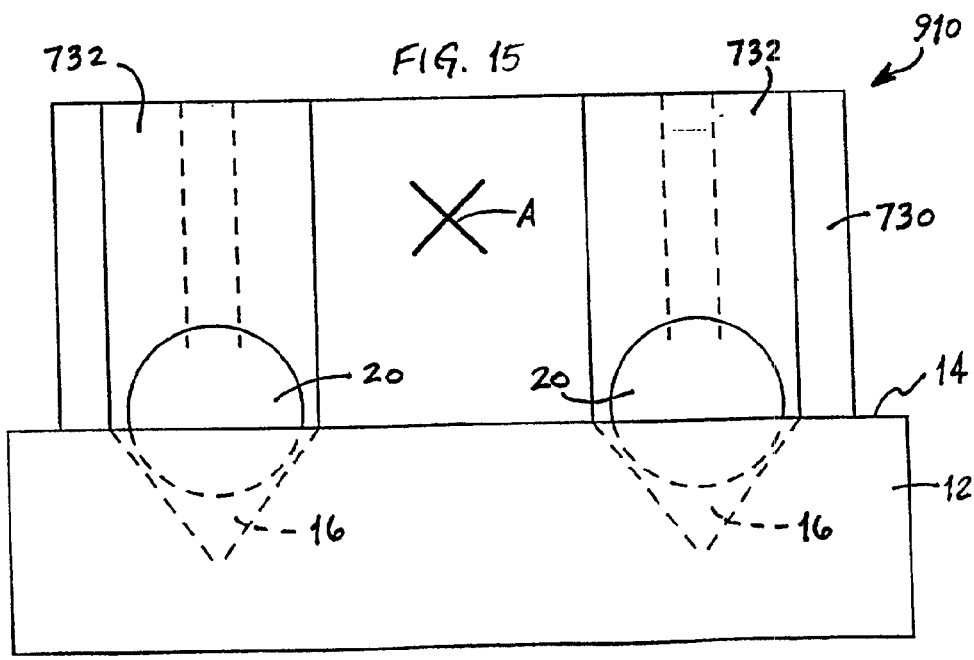
FIG. 15 is a side view of the optical subassembly of FIG. 14.

Alternatively, and as shown in FIGS. 14–15, V-grooves or other suitable grooves formed in a direction perpendicular to the page, or "vertically", can replace the pits 132. The optical subassembly 910 shown in FIGS. 14–15 includes the substrate 12 and an optical device 730 with three vertically directed V-grooves 732 which mate with three respective spheres 20, and a pit 733 which mates with the final sphere 20. It should be appreciated that the pit 733 may be replaced with a fourth vertically directed V-groove 732, or any of the other V-grooves 732 may be replaced with a pit 733. As shown more clearly in FIG. 15, the V-grooves 732 extend vertically from the upper surface 14 of the substrate and perpendicular to the rotational axis A when the optical device 730 is mounted on the substrate 12.

Figure 9:
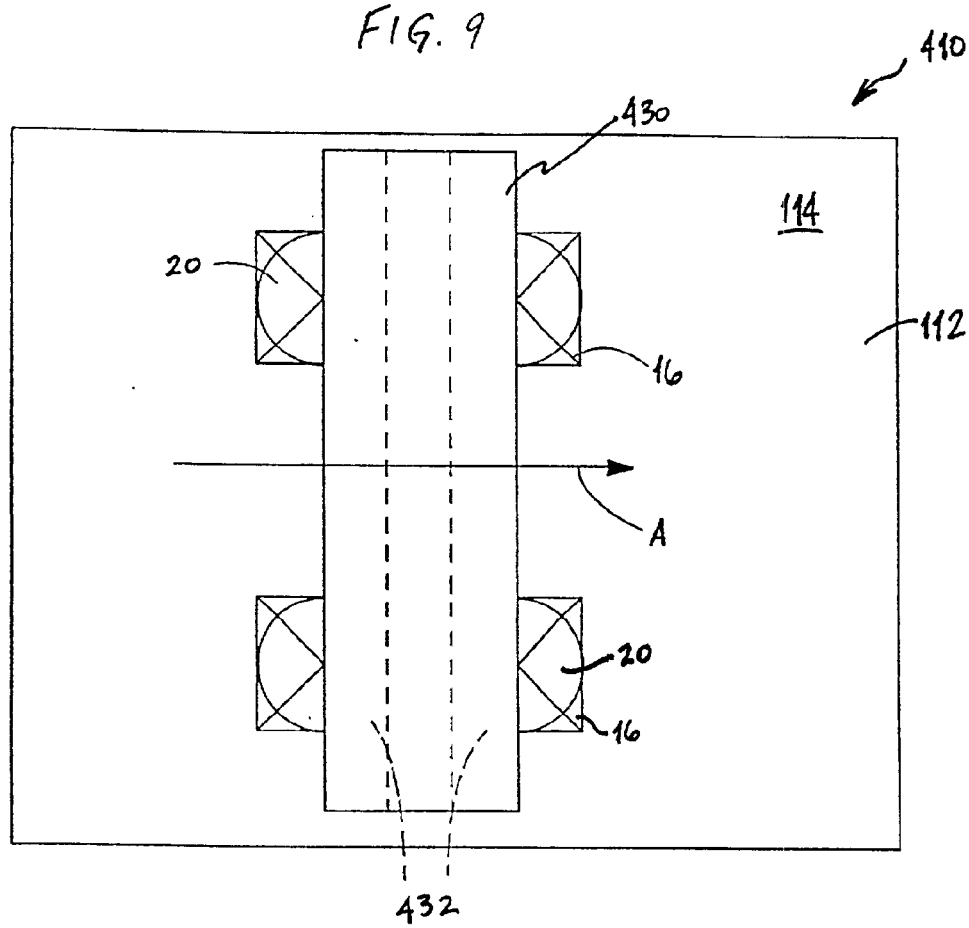
FIG. 9 is a top view showing an optical subassembly constructed in accordance with another embodiment of the invention.

FIG. 9 is a top view of another embodiment of the invention. An optical device 430 is mounted on the substrate 112 via on two pair of spheres 20 to form the optical subassembly 410. The spheres are positioned in the pits 16. Instead of micromachined pits within the optical device, the optical device 430 includes a pair of grooves 432 extending along its length. As illustrated, the grooves 432 and the spheres 20 are sized to accurately mount the optical device 430 to be approximately perpendicular to a longitudinal axis of the substrate 112, which is parallel to the optical axis A. It should be appreciated, however, that the grooves 432 and the spheres 20 may be sized and configured to orient the optical device 430 at a transverse angle to the longitudinal axis of the substrate 112, such as shown in FIG. 5.

Figure 10:
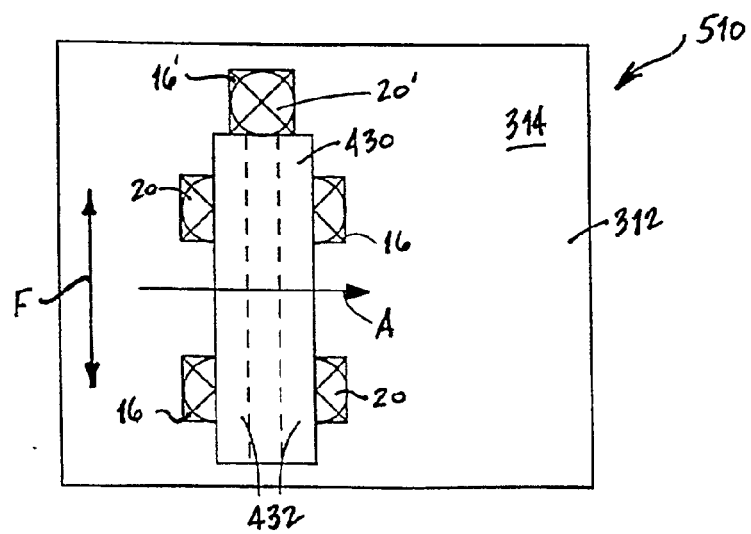
FIG. 10 is a top view showing an optical subassembly constructed in accordance with another embodiment of the invention.

Another embodiment of the invention is illustrated in FIG. 10. The optical subassembly 510 of FIG. 10 includes four spheres 20 positioned within pits 16 and an additional sphere 20' within an additional pit 16' in the upper surface 314 of the substrate 312. Sphere 20' has the same diameter as spheres 20. The additional sphere 20' serves to laterally position the optical device 430 on the substrate 312. The optical device 430 can be slid to contact the additional sphere 20'. It should be appreciated that spheres larger or smaller than spheres 20 may be used instead of sphere 20' for lateral positioning purposes.

Figure 11:
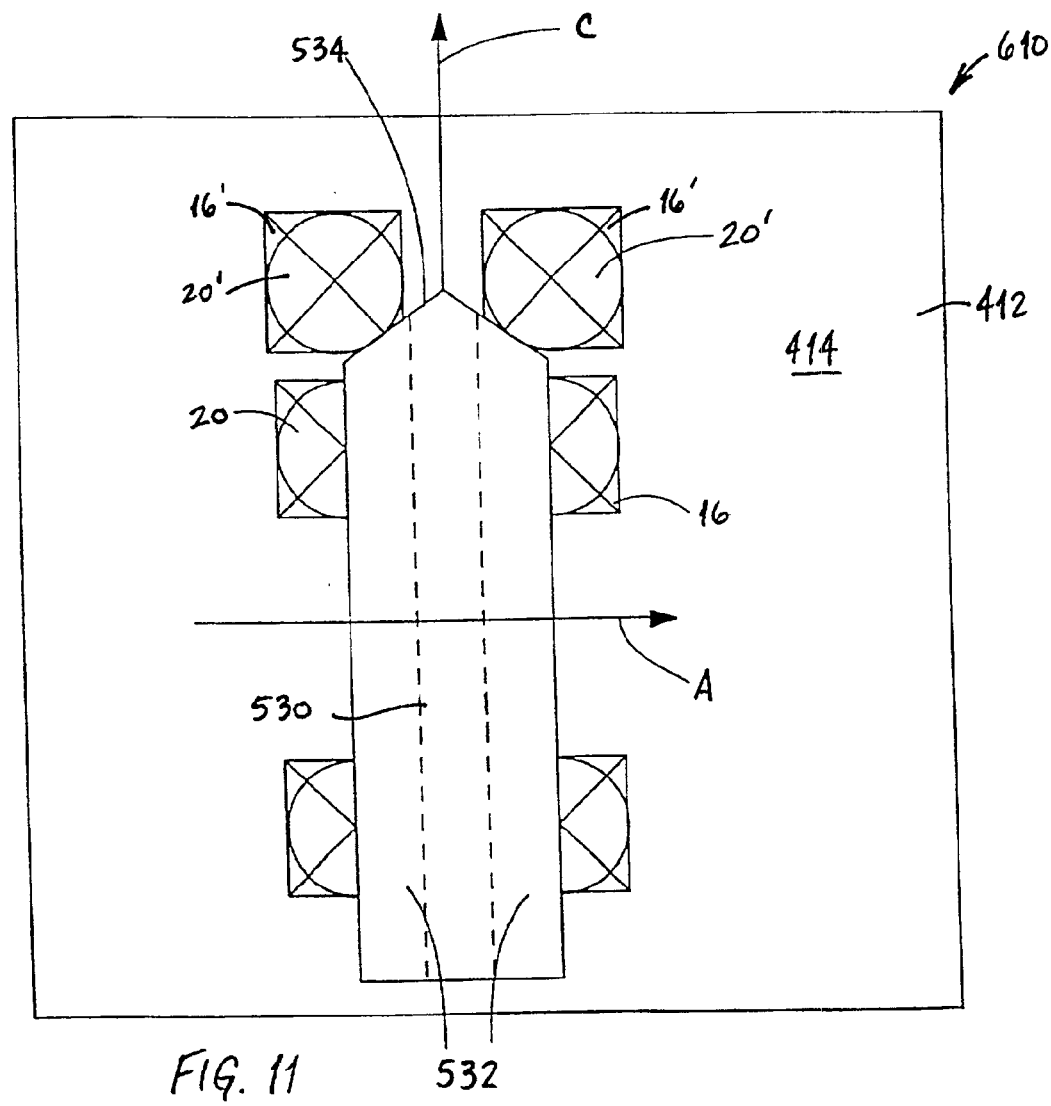
FIG. 11 is a top view showing an optical subassembly constructed in accordance with another embodiment of the invention.

FIG. 11 shows another embodiment of the invention having additional spheres 20'. As with the optical subassembly 510 shown in FIG. 10, the optical subassembly 610 includes additional spheres 20', set within pits 16' in an upper surface 412 of a substrate 412. The optical device 530 includes grooves 532 extending parallel to the axis C. While illustrated as extending the entire length of the optical device 530, it should be appreciated that the grooves 532 instead may extend only partially along the optical device 530. At one end of the optical device 530 are etched edges 534. The spheres 20' serve to provide tilt control for an optical device 530 about the axis C. Further, the spheres 20' provide transverse positioning for the optical device 530. The edges 534 abut the additional spheres 20 to provide lateral adjustment of the optical device 530. It should be appreciated that another lateral adjustment mechanism beside a sphere 20' may be employed.

Figure 12:
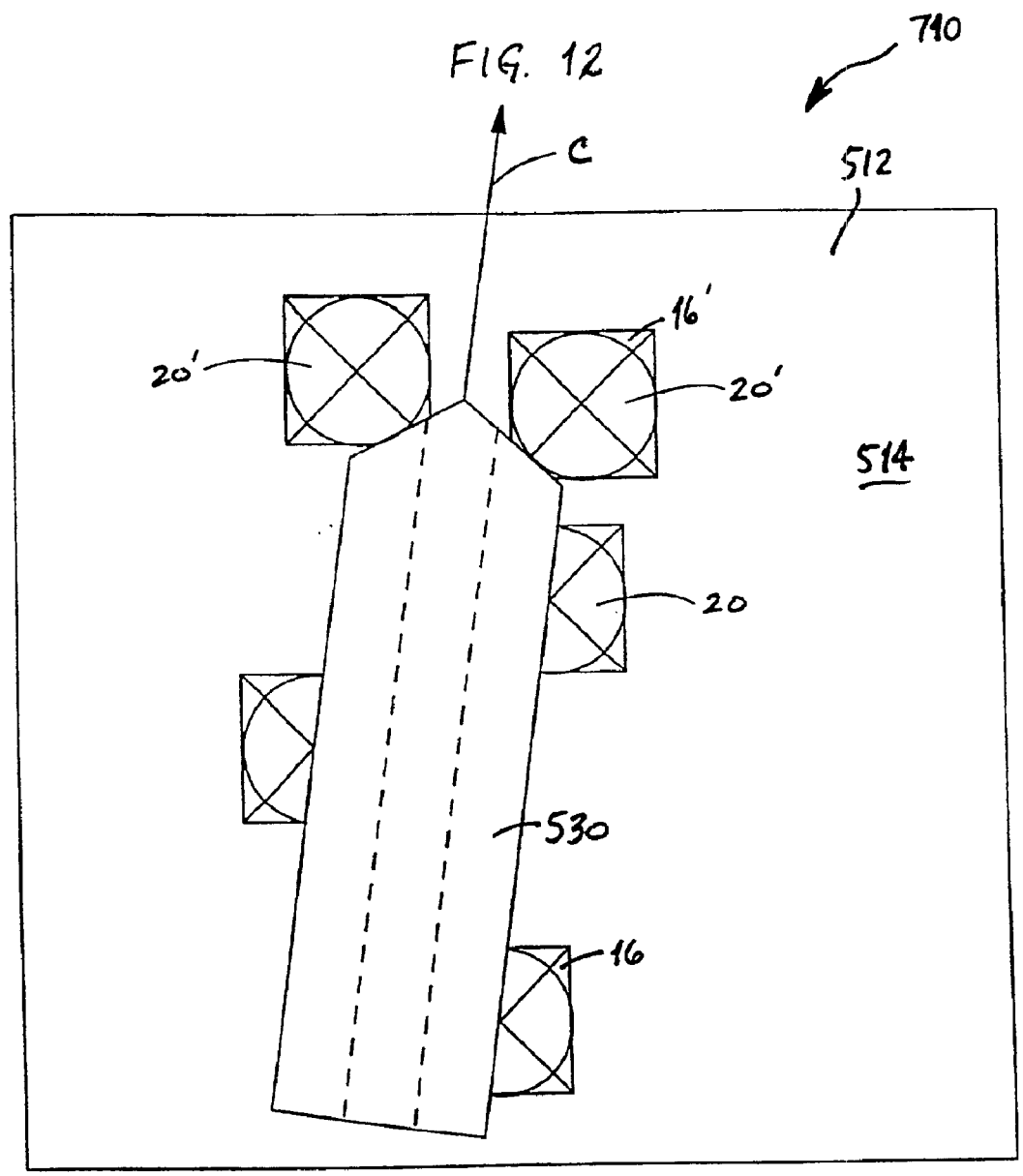
FIG. 12 is a top view showing an optical subassembly constructed in accordance with another embodiment of the invention.

Orientation about the axis C is provided by the placement and size of the spheres 20', and thus, by the placement of the pits 16' within the substrate. As shown in FIG. 12, another embodiment of the invention is illustrated optical subassembly 710 includes a plurality of spheres 20 and spheres 20' within a substrate 512 which are staggered to provide a predetermined amount of tilt to the optical device 530 about the axis C. Specifically, pits 16 are formed at predetermined locations within the upper surface 514 of the substrate 512 to obtain a predetermined amount of orientation.

Figure 13:
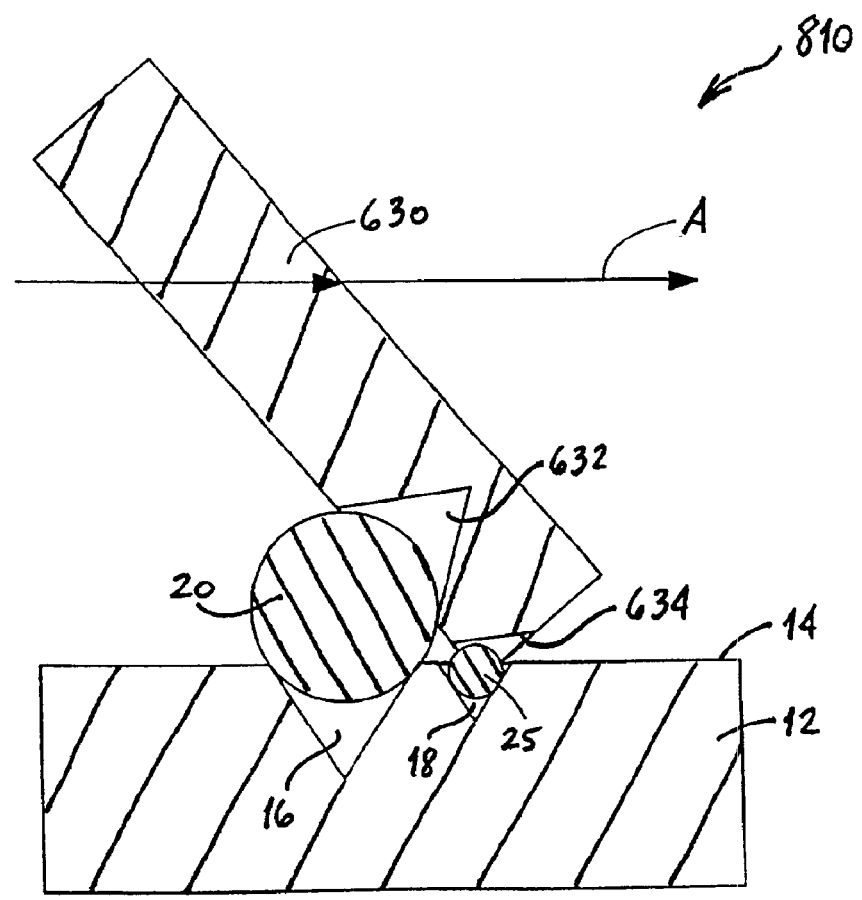
FIG. 13 is a cross-sectional view showing an optical subassembly constructed in accordance with another embodiment of the invention.

FIG. 13 illustrates yet another embodiment of the invention. An optical subassembly 810 is shown including the substrate 12, one or more spheres 20 and 25, and an optical device 630. The optical device 630 includes a pit 632 and a pit 634. The pit 632 allows mating of the optical device 630 with the sphere 20, while the pit 634 allows mating of the optical device 630 with the sphere 25. Alternatively, V-grooves or other suitable grooves extending in a direction parallel to the upper surface 14 and perpendicular to the optical axis, or light path, A may be formed in the optical device 630 for mating it with the spheres 20, 25.

Additionally, spheres 20 and 25 can be positioned in such a way in the surface of the substrate so as to provide angular control of an optical device about an axis extending perpendicularly from the plane of the surface of the substrate. As shown in FIG. 16, a sphere 20 and two spheres 25 are positioned within an upper surface 614 of a substrate 612 so as to provide an optical subassembly 1110. The optical subassembly 1110 includes the optical device 30 which is positioned at a predetermined angle about a rotational axis which extends perpendicularly from the upper surface 614.

FIG. 17 illustrates another embodiment of the invention. An optical subassembly 1210 includes an optical device 830 mounted on an upper surface 714 of a substrate 712 between three spheres 20 positioned in pits 16. Further, the illustrated optical device 830 includes two pits or V-grooves 832 on one side and another pit or V-groove 832' on the other side. The optical device 830 is positioned so that the two pits or V-grooves 832 on one side of the device 830 correspond with two of the pits 16, and the other pit or V-groove 832' corresponds with the final pit 16. In this way, a good mechanical coupling can be obtained between the optical device 830 and the spheres 20. As shown, there are six contact points, two per sphere, between the spheres 20 and the optical device 830. The optical device 830 may further flex slightly to enhance the mechanical coupling between itself and the spheres 20.

Figure 18:
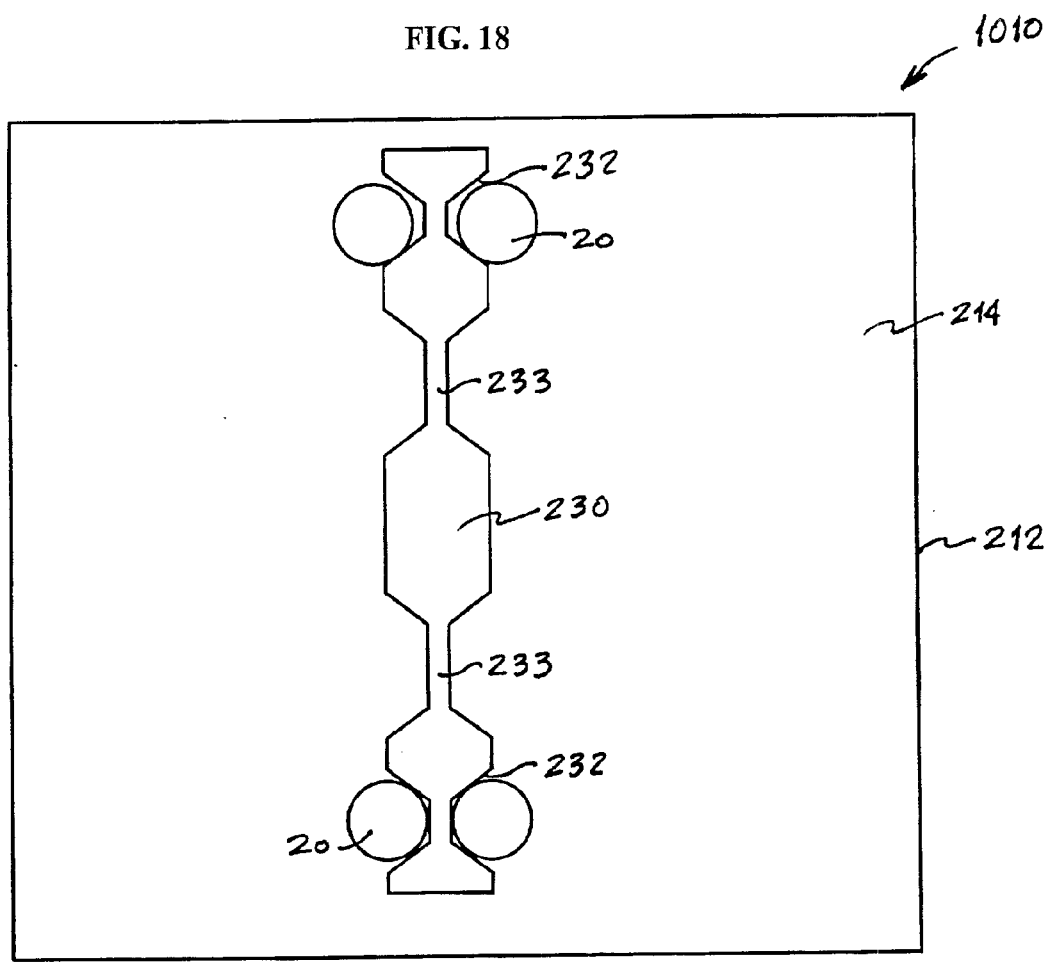
FIG. 18 is a top view showing an optical subassembly constructed in accordance with another embodiment of the invention.

Shown in FIG. 18 is another embodiment of the invention. The optical subassembly 1010 shown therein includes an optical device 230 which includes a pair of flexure portions 233. The optical device 230 is mounted on the substrate 212 surface 214 via spheres 20 which are positioned in pits 232, although grooves may be used instead of the pits 232. The flexure portions 233 assist in holding the optical device 230 in position on the substrate 212.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although V-grooves are described and illustrated, it should be appreciated that other shapes of grooves may be utilized. Further, while spheres of varying sizes are described and shown, other positioning mechanisms may be employed, such as, for example, cylindrical structures, rods or other suitable structures, made of glass or metal or other suitable material. Accordingly, the invention is not to be seen as limited by the foregoing description, but is only limited by the scope of the appended claims.

What is claimed as new and desired to be protected by Letters Patent of the United States is:

1. An optical subassembly, comprising:
   an optical device having a planar surface;
   a substrate having an upper surface and a plurality of pits;
   a positioning mechanism disposed in each said pit, wherein said optical device contacts said positioning mechanisms and is positioned on said substrate such that said planar surface is tilted relative to said upper surface; and
   a lateral adjustment mechanism for laterally positioning said optical device on said substrate.

2. The optical subassembly of claim 1, wherein each said positioning mechanism comprises a column.

3. The optical subassembly of claim 1, wherein each said positioning mechanism comprises a sphere.

4. The optical subassembly of claim 3, wherein at least one of said spheres is a different size than the remainder of said spheres.

5. The optical subassembly of claim 1, wherein said optical device includes one or more grooves, said optical device grooves being sized and configured to receive at least one of said positioning mechanisms.

6. The optical subassembly of claim 5, wherein at least one of said optical device grooves is located on a different surface of said optical device than the remainder of said optical device grooves.

7. The optical subassembly of claim 5, wherein said one or more optical device grooves extend perpendicular to an optical axis of said optical device and said upper surface of said substrate.

8. The optical subassembly of claim 1, wherein said lateral adjustment mechanism comprises one or more spheres.

9. The optical subassembly of claim 1, wherein one or more edges of said optical device are at transverse angles with an optical axis of said optical device, said one or more edges abutting said lateral adjustment mechanism.

10. The optical subassembly of claim 1, wherein said optical device includes at least one flexure portion.

11. An optical subassembly, comprising:
    an optical device having at least one cut-out portion;
    a substrate having an upper surface and a plurality of pits; and
    a positioning mechanism disposed in each said pit, wherein said positioning mechanisms contact said at least one cut-out portion.

12. The optical subassembly of claim 11, comprising a plurality of cut-out portions each contacting a respective said positioning mechanism.

13. The optical subassembly of claim 12, wherein at least one of said cut-out portions is located on a different surface of said optical device than the remainder of said cut-out portions.

14. The optical subassembly of claim 12, wherein said cut-out portions comprise pits.

15. The optical subassembly of claim 12, wherein said cut-out portions comprise grooves.

16. The optical subassembly of claim 15, wherein said grooves extend in a direction perpendicular to said upper surface.

17. The optical subassembly of claim 15, wherein said grooves extend in a direction parallel to said upper surface.

18. An optical subassembly, comprising:
    a substrate having an upper surface and a plurality of pits;
    an optical device having a pair of opposing long surfaces and a pair of opposing edge surfaces;
    a lateral adjustment mechanism for laterally positioning said optical device on said substrate, wherein one or more edges of said optical device are at transverse angles with an optical axis of said optical device, said one or more edges abutting said lateral adjustment mechanism; and
    a plurality of spheres each being disposed within a respective said pit, wherein said optical device is positioned on said spheres.

19. The optical subassembly of claim 18, wherein said lateral adjustment mechanism comprises one or more spheres.

20. The optical subassembly of claim 18, wherein said pits are disposed on said upper surface in a predetermined pattern.

21. The optical subassembly of claim 18, wherein at least one of said spheres is of a different size than the remainder of said spheres.

22. The optical subassembly of claim 18, wherein said optical device includes a plurality of cut-out portions sized and configured to receive at least one of said spheres.

23. The optical subassembly of claim 22, wherein at least one of said cut-out portions is located on a different surface of said optical device than the remainder of said cut-out portions.

24. The optical subassembly of claim 22, wherein said cut-out portions comprise pits.

25. The optical subassembly of claim 22, wherein said cut-out portions comprise grooves.

26. The optical subassembly of claim 25, wherein said grooves extend in a direction perpendicular to said upper surface.

27. The optical subassembly of claim 25, wherein said grooves extend in a direction parallel to said upper surface.

28. The optical subassembly of claim 18, wherein said optical device includes at least one flexure portion.

29. A method for positioning an optical device on an upper surface of a substrate, said method comprising:
    mounting a plurality of positioning mechanisms in predetermined locations on said substrate;
    mounting an optical device having a planar surface on said positioning mechanisms wherein said planar surface is tilted relative to said upper surface;
    mounting on said substrate a lateral adjustment mechanism for laterally positioning said optical device on said substrate; and
    anchoring the optical device.

30. The method of claim 29, wherein said mounting of a plurality of positioning mechanisms in predetermined locations comprises positioning a plurality of spheres on said upper surface of said substrate.

31. The method of claim 30, further comprising forming a plurality of pits on said upper surface of said substrate, said pits being sized and configured to receive said spheres.

32. The method of claim 29, wherein said anchoring comprises affixing the optical device to the substrate.

33. A method for positioning an optical device on an upper surface of a substrate, said method comprising:
    mounting a plurality of positioning mechanisms in predetermined locations on said substrate;
    mounting an optical device having a planar surface on said positioning mechanisms wherein said planar surface is tilted relative to said upper surface; and
    affixing the optical device to the substrate,
    wherein the optical device and the substrate include metal, said affixing comprising soldering the optical device to the substrate.

34. The method of claim 29, wherein said anchoring comprises affixing the optical device to at least one of the positioning mechanisms.

35. The method of claim 34, wherein the optical device and the positioning mechanisms include metal, said affixing comprising soldering the optical device to the at least one of the positioning mechanisms.

36. A method for positioning an optical device on an upper surface of a substrate, said method comprising:
    mounting a plurality of positioning mechanisms in predetermined locations on said substrate;
    forming at least one cut-out portion on an optical device;
    mounting said optical device on said substrate such that said at least one cutout portion contacts at least one said positioning mechanisms; and
    anchoring the optical device.

37. The method of claim 36, wherein said forming comprises forming a plurality of pits sized and configured to receive said positioning mechanisms.

38. The method of claim 37, wherein said forming comprises forming at least one of said optical device pits on a different surface of the optical device than the remainder of the optical device pits.

39. The method of claim 36, wherein said forming comprises forming a plurality of grooves sized and configured to receive said positioning mechanisms.

40. The method of claim 39, wherein said forming comprises forming said grooves to extend perpendicular to an optical axis of the optical device and the upper surface of the substrate.

* * * * *